United States Patent
Reunert et al.

(10) Patent No.: US 6,738,773 B1
(45) Date of Patent: May 18, 2004

(54) METHOD AND SYSTEM FOR TRANSFORMING DATA BETWEEN DISPARATE CAPACITY DATABASE SYSTEMS

(75) Inventors: Philip P. Reunert, Redmond, WA (US); Mohanraj Dharmarajan, Redmond, WA (US); Jeffrey G. Ort, Redmond, WA (US); Peter Zatloukal, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/562,992

(22) Filed: May 1, 2000

(51) Int. Cl.[7] ............................. G06F 17/30; G06F 7/00
(52) U.S. Cl. ................................ 707/10; 707/8; 707/1; 707/104.1; 707/200; 707/201
(58) Field of Search .................. 707/1–10, 100–104.1, 707/200–205; 709/200–225, 210–231

(56) References Cited

U.S. PATENT DOCUMENTS

| | | | | |
|---|---|---|---|---|
| 5,504,899 A | * | 4/1996 | Raz | .............................. 707/10 |
| 5,546,579 A | * | 8/1996 | Josten et al. | ................... 700/5 |
| 5,806,076 A | * | 9/1998 | Ngai et al. | ................... 707/203 |
| 5,819,083 A | * | 10/1998 | Chen et al. | ................... 370/235 |
| 5,850,507 A | * | 12/1998 | Ngai et al. | ................... 707/202 |
| 5,862,327 A | * | 1/1999 | Kwang et al. | ................. 707/10 |
| 5,930,794 A | * | 7/1999 | Linenbach et al. | ......... 707/100 |
| 5,944,796 A | * | 8/1999 | Noritomi | |
| 5,961,606 A | * | 10/1999 | Talluri et al. | |
| 5,978,577 A | * | 11/1999 | Rierden et al. | ........ 340/825.52 |
| 6,003,043 A | * | 12/1999 | Hatakeyama et al. | ....... 707/102 |
| 6,058,413 A | * | 5/2000 | Flores et al. | .................... 705/7 |
| 6,131,115 A | * | 10/2000 | Anderson et al. | ............. 705/40 |
| 6,157,932 A | * | 12/2000 | Klein et al. | ................. 707/200 |
| 6,202,067 B1 | * | 3/2001 | Blood et al. | ................... 707/10 |
| 6,240,417 B1 | * | 5/2001 | Eastwick et al. | .............. 707/1 |

* cited by examiner

Primary Examiner—Srirama Channavajjala
(74) Attorney, Agent, or Firm—Woodcock Washburn LLP

(57) ABSTRACT

In many computer systems, the rate of data from an input source may become significantly faster than a processor's ability to respond. This situation occurs when a faster and more modern system writes to an older and slower legacy system. The result of this interaction between disparate capacity systems may be system failure or data corruption, particularly due to overloading the slower system's input queue to the point where it can no longer catch up to its workload. The invention provides a method, system, and computer-readable medium having computer-executable instructions for transferring data between disparate capacity systems. The method comprises the steps of receiving transactions from a first computer system at a first rate and providing the transactions to a second computer system, wherein the second computer system receives the transactions at a second rate. The second computer system may be a database legacy database server and the first computer system may be an updated database server The second rate is set at a capacity of the second computer system. The method further delays for a predetermined period of time the transactions when the first rate exceeds the second rate. The predetermined period of time is a function of the second rate.

27 Claims, 6 Drawing Sheets

METHOD AND SYSTEM FOR TRANSFORMING DATA BETWEEN DISPARATE CAPACITY DATABASE SYSTEMS

TECHNICAL FIELD

The present invention relates to the field of data transfer. More specifically, the present invention relates to transferring data between disparate capacity database systems.

BACKGROUND OF THE INVENTION

A database system is a collection of information organized in such a way that data may be accessed quickly. Database applications are present in everyday use including automated teller machines, flight reservation systems, and internet-account systems of all types. A database management system (DBMS) is a collection of programs that allow the entry, modification, and selection of data in a database. There are various types of DBMSs, ranging from small systems that run on personal computers to larger systems that run on mainframe systems.

Requests for information from a database are made by a database server using a query language. Different DBMSs support different query languages, including a standardized language called "structured query language" (SQL), for example. Database servers that use SQL are often referred to as "SQL servers." SQL supports distributed database systems, which are databases that are spread out over several server systems, yet act as one. A distributed database system must replicate and synchronize data among its many databases. In this way, a distributed database system may enable several users on a network to access the same database simultaneously without interfering with one another. Therefore, a distributed database system may have many SQL servers located in various locations, each responsible for certain portions of the database's overall operation.

In distributed database systems often there occurs a disparity in the relative capacity to perform work among the individual databases in the system. This can happen for a variety of reasons, including but not limited to new demand conditions, addition of newer hardware in one subsystem which is substantially faster than the legacy systems, and progressive redesign and redeployment of portions of an existing system. Moreover, it may be more efficient to gain the functionality of a new distributed database by dividing the database's operation between a newer and faster database server and the legacy server. In either case, the result is that various versions of database servers simultaneously may exist in one database system.

Although having multiple versions of SQL servers in one database system may be more cost efficient, often this scenario causes technical concerns. This is particularly true, for example, where a database system is designed to allow a faster upgraded database server to automatically transact with a slower legacy database that may be in various states of repair. In this instance, transactions may be received from the upgraded server at a rate faster than the legacy server can process them. This disparate capacity is particularly troubling in a distributed database system where the overwhelming rate of transactions entering the legacy system may break down the replication process and return corrupted or stale data to the upgraded server.

To date, when confronted with these disparate server systems, administrators are forced to upgrade the slower legacy system to be compatible with the faster upgraded system. Therefore, there exists a need to regulate incoming transactions from the upgraded server to a rate that is compatible with the slower legacy server.

SUMMARY OF THE INVENTION

In many computer systems, the rate of data from an input source may become significantly faster than a processor's ability to respond. This situation occurs, for example, when a faster and more modern system writes to an older and slower legacy system. Such interactions between disparate capacity systems may result in failure or data corruption, particularly due to overloading the slower system's input queue to the point where it can no longer catch up to its workload. For example, in a database computer system, when the rate of incoming transactions from an updated database system exceeds a smaller capacity database system's ability to process transactions, system failure may occur. In some instances when this situation arises, system administrators may upgrade the legacy database system to operate with the updated database system. In running production systems, this is often operationally unfeasible, or not feasible in a reasonable time frame. Where system upgrade is impossible or unfeasible, there exists a need to slow incoming transactions down to a rate compatible with the slower legacy system.

The invention provides a method, system, and computer-readable medium having computer-executable instructions for transferring data between disparate capacity systems. The method comprises the steps of receiving transactions from a first computer system at a first rate and providing the transactions to a second computer system, wherein the second computer system receives the transactions at a second rate. The second computer system may be a database legacy database server and the first computer system may be an updated database server The second rate is set at a capacity of the second computer system. The method further delays for a predetermined period of time the transactions when the first rate exceeds the second rate. The predetermined period of time is a function of the second rate.

BRIEF DESCRIPTION OF THE DRAWINGS

Other features of the invention are further apparent from the following detailed description of presently preferred embodiments of the invention taken in conjunction with the accompanying drawings, of which.

DETAILED DESCRIPTION OF THE INVENTION

Operating Environment

Figure 1:
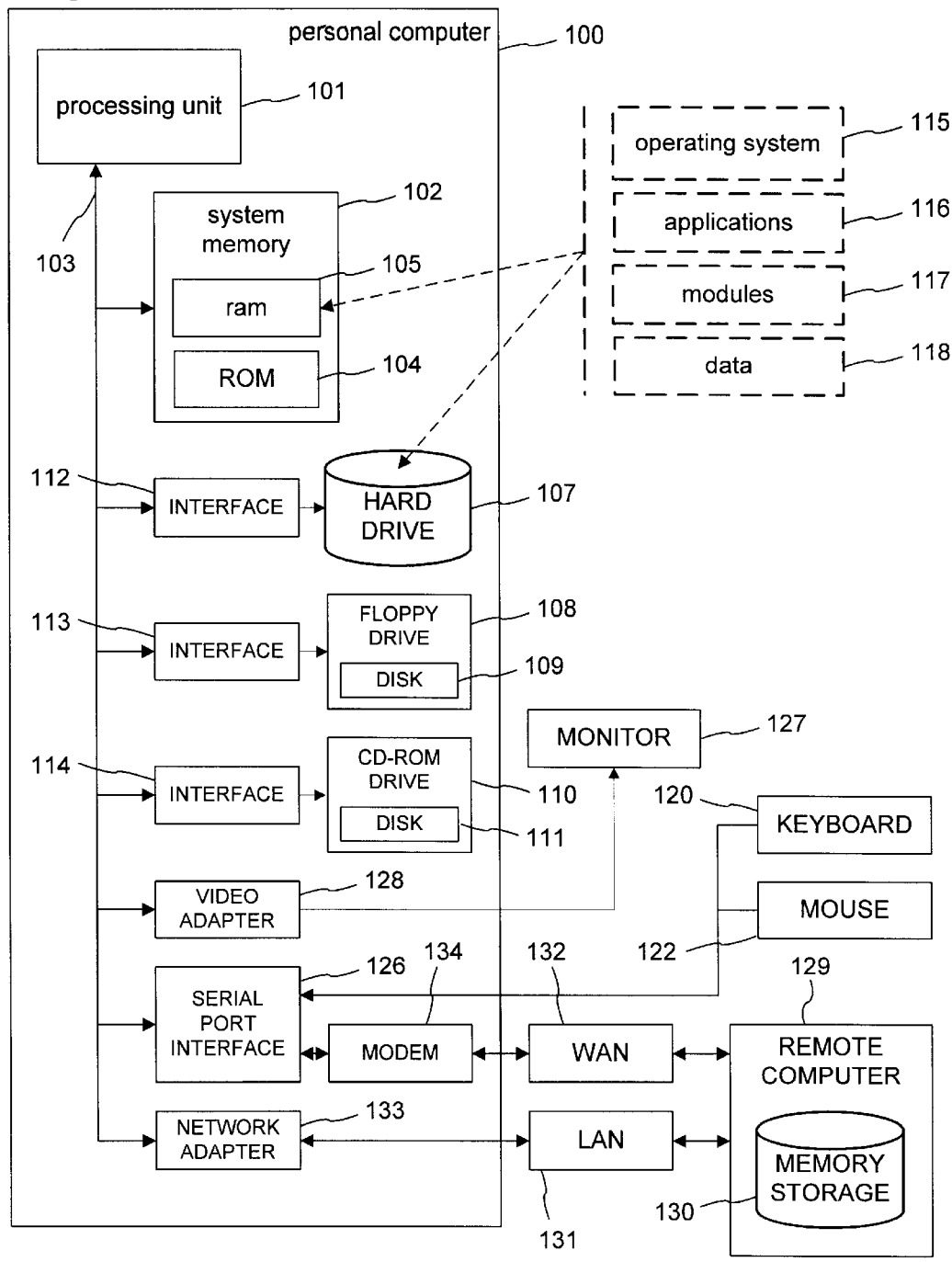
FIG. 1 is a block diagram of a suitable computing environment in which the present invention may be implemented.

FIG. 1 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. However, some embodiments of the invention can be practiced on standalone computers. In a distributed computing environment, program modules may be located in both local and remote memory storage devices.

With reference to FIG. 1, one system for implementing the invention includes a conventional personal computer 100, including a processing unit 101, a system memory 102, and a system bus 103 that couples various system components including the system memory to the processing unit 101. Processing unit 101 may be any of various commercially available processors. Dual microprocessors and other multiprocessor architectures also can be used as processing unit 101.

System bus 103 may be any of several types of bus structure including a memory bus or memory controller, a peripheral bus, and a local bus using any of a variety of conventional bus architectures. System memory 102 includes read only memory (ROM) 104 and random access memory (RAM) 105. A basic input/output system (BIOS), containing the basic routines that help to transfer information between elements within the personal computer 100, such as during start-up, is stored in ROM 104.

Personal computer 100 further includes a hard disk drive 107 and a magnetic disk drive 108 to read from or write to a removable disk 109, and an optical disk drive 110 to read a CD-ROM disk 111 or to read from or write to other optical media. Hard disk drive 107, magnetic disk drive 108, and optical disk drive 110 are connected to system bus 103 by a hard disk drive interface 112, a magnetic disk drive interface 113, and an optical drive interface 114, respectively. The drives and their associated computer-readable media provide nonvolatile storage of data, data structures, computer-executable instructions, etc. for personal computer 100. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the operating environment.

A number of program modules may be stored in the drives and RAM 105, including an operating system 115, one or more application programs 116, other program modules 117, and program data 118.

A user may enter commands and information into personal computer 100 through a keyboard 120 and pointing device, such as a mouse 122. Other input devices (not shown) may include a microphone, joystick, game pad, satellite dish, scanner, or the like. These and other input devices are often connected to processing unit 101 through a serial port interface 126 that is coupled to system bus 103, but may be connected by other interfaces, such as a parallel port, game port or a universal serial bus (USB). A monitor 127 or other type of display device is also connected to system bus 103 via an interface, such as a video adapter 128. In addition to monitor 127, personal computers typically include other peripheral output devices (not shown), such as speakers and printers.

Personal computer 100 may operate in a networked environment using logical connections to one or more remote computers, such as a remote computer 129. Remote computer 129 may be a server, a router, a peer device or other common network node, and typically includes many or all of the elements described relative to personal computer 100, although only a memory storage device 130 has been illustrated in FIG. 2. The logical connections depicted in FIG. 2 include a local area network (LAN) 131 and a wide area network (WAN) 132. Such networking environments are commonplace in offices, enterprise-wide computer networks, intranets and the Internet.

When used in a LAN networking environment, personal computer 100 is connected to local network 131 through a network interface or adapter 133. When used in a WAN networking environment, personal computer 100 typically includes a modem 134 or other means for establishing communications over wide area network 132, such as the Internet. Modem 134, which may be internal or external, is connected to system bus 103 via serial port interface 126. In a networked environment, program modules depicted relative to personal computer 100, or portions thereof, may be stored in the remote memory storage device. It will be appreciated that the network connections shown are one example, and that other means of establishing a communications link between the computers may be used.

In accordance with the practices of persons skilled in the art of computer programming, the present invention is described below with reference to acts and symbolic representations of operations that are performed by personal computer 100, unless indicated otherwise. Such acts and operations are sometimes referred to as being computer-executed. It will be appreciated that the acts and symbolically represented operations include the manipulation by the processing unit 101 of electrical signals representing data bits which causes a resulting transformation or reduction of the electrical signal representation, and the maintenance of data bits at memory locations in the memory system (including system memory 102, hard drive 107, floppy disks 109, and CD-ROM 111) to thereby reconfigure or otherwise alter the computer system's operation, as well as other processing of signals. The memory locations where data bits are maintained are physical locations that have particular electrical, magnetic, or optical properties corresponding to the data bits.

Database Client-Server System

Figure 2:
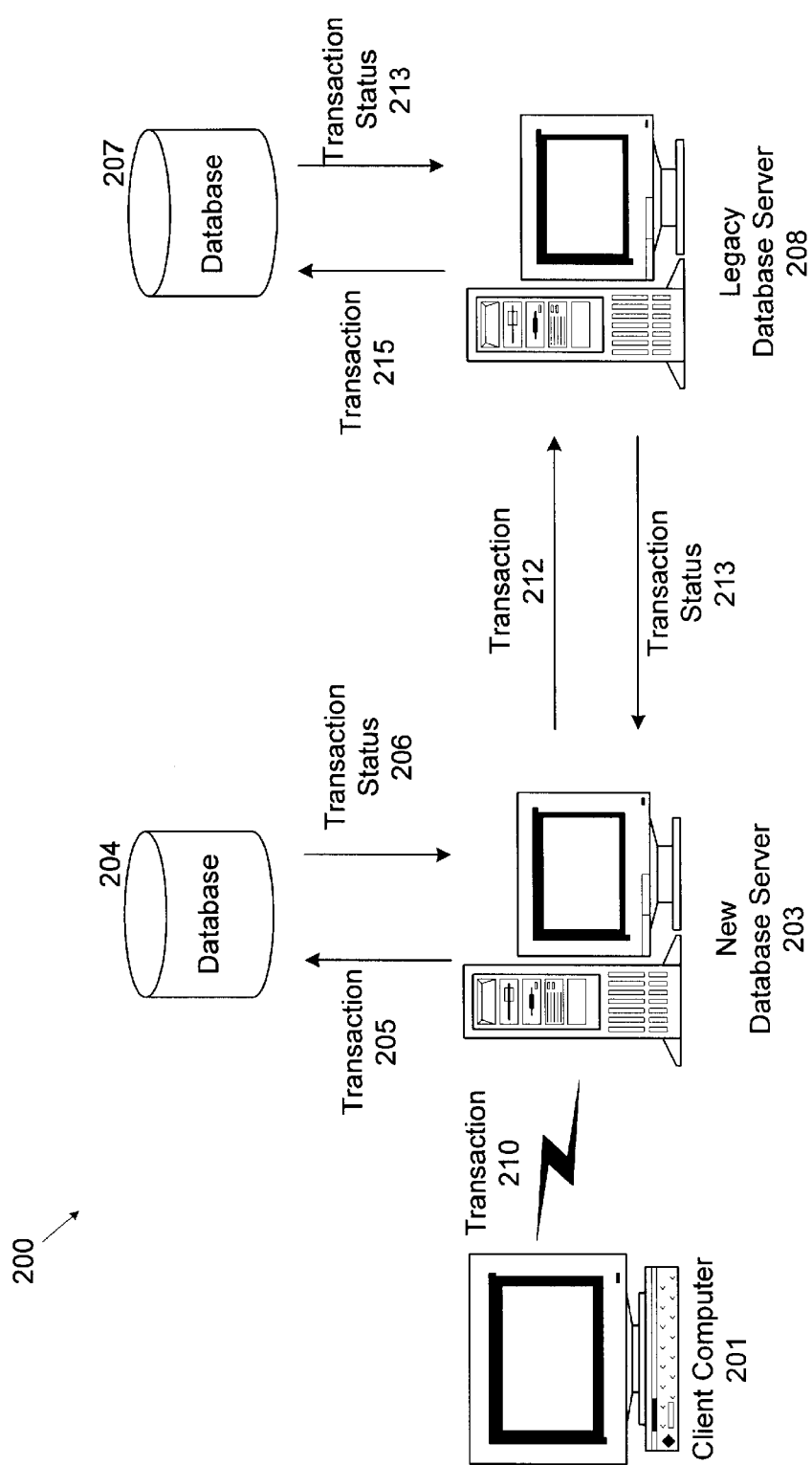
FIG. 2 is a block diagram of a client-server database system in which the present invention may be implemented.

FIG. 2 is a block diagram of a client-server database system 200 in which the present invention may be implemented. Client-server system 200 includes a client computer 201 coupled to a new database server 203. Client computer 201 may be a personal computer (as shown in FIG. 1) containing software that allows a user to access a database, for example, ACCESS available from MICROSOFT Corporation. It should be appreciated that while one client computer 201 is shown in FIG. 2, in practice, there may be many client computers simultaneously accessing new database processor 203. Client computer 201 sends a transaction 210 to new database server 203. The connection between client computer 201 and new database processor 203 may be a LAN or WAN, for example, the Internet. New database server 203 is coupled to an older, slower legacy database server 208. New database server 203 may be an upgraded and updated version of legacy database server 208, both in terms of faster hardware and/or next generation software. New database server 203 is coupled to database 204, and legacy database server 208 is coupled to database 207.

In operation, client computer 201 sends a transaction 210 to new database server 203. It should be appreciated that transaction 210 may include a set of instructions necessary to execute a particular operation. The set of instructions may include both a request to read data from a database and a request to write data to a database. Once new database server 203 receives transaction 210 from computer client 201, new database server 203 determines whether completion of transaction 210 requires access to data located in database 204 or database 207. If transaction 210 requires access to data located in database 204, new database server 203 sends a transaction 205 to database 204. Upon completion of transaction 205, new database server 203 receives a transaction status 206 indicating that transaction 205 is complete. Alternatively, transaction status 206 may provide an error signal to new database server 203 indicating that transaction 205 was not completed. If new database server 203 determines that some or all of transaction 210 requires access to data located in database 207, new database server 203 sends a transaction 212 to legacy database server 208. Legacy database server 208 then sends a transaction 215 to database 207. Legacy database server 208 receives a transaction status 213 indicating that transaction 212 is complete. Alternatively, transaction status 213 may provide an error signal to new database server 203 indicating that transaction 212 was not completed.

Data Throttling Operation

Figure 3:
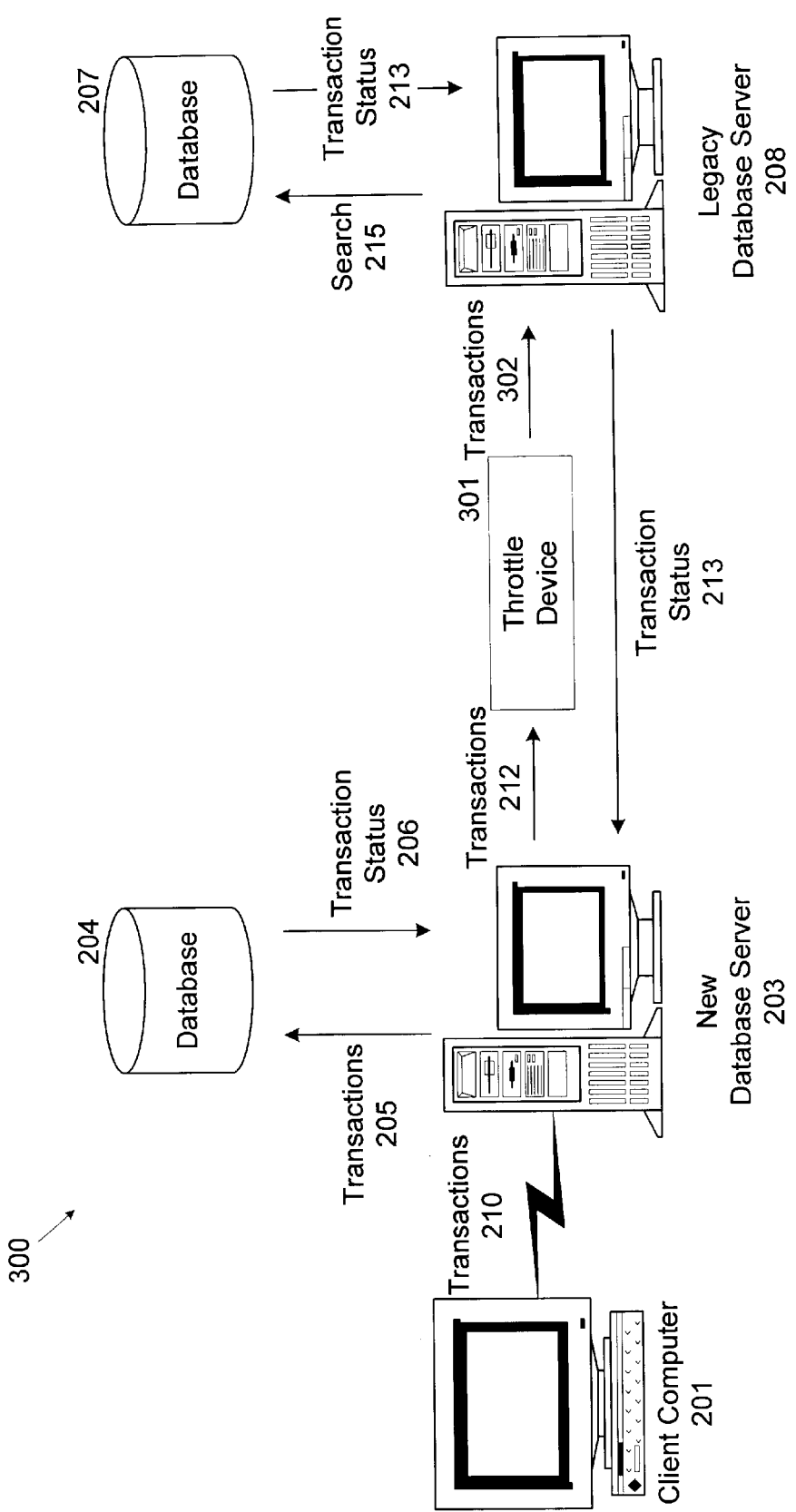
FIG. 3 is a block diagram of a client-server database system, according to the present invention.

FIG. 3 is a block diagram of a database client-server system 300, according to the present invention. FIG. 3 is similar to the block diagram shown in FIG. 2, except that a throttle device 301 is coupled between new database server 203 and legacy database server 208. Although throttle device 301 is shown separate from new database server 203, it should be appreciated that throttle device 301 may be a hardware or software component of new database server 203 or of legacy database server 208. As shown in FIG. 3, transactions 205 from new database server 203 enter throttle device 301. Transactions 302 are then provided by throttle device 301 to legacy database server 208. Because new database server 203 is an upgraded and updated version of older legacy database server 208, the rate that at which transactions 205 are received from new database server 203 may be faster than the rate at which legacy database server 208 can process incoming transactions 302. Therefore, throttle device 301 regulates received transactions 205 to a rate that is compatible with the processing speed of slower legacy database server 208.

Figure 4:
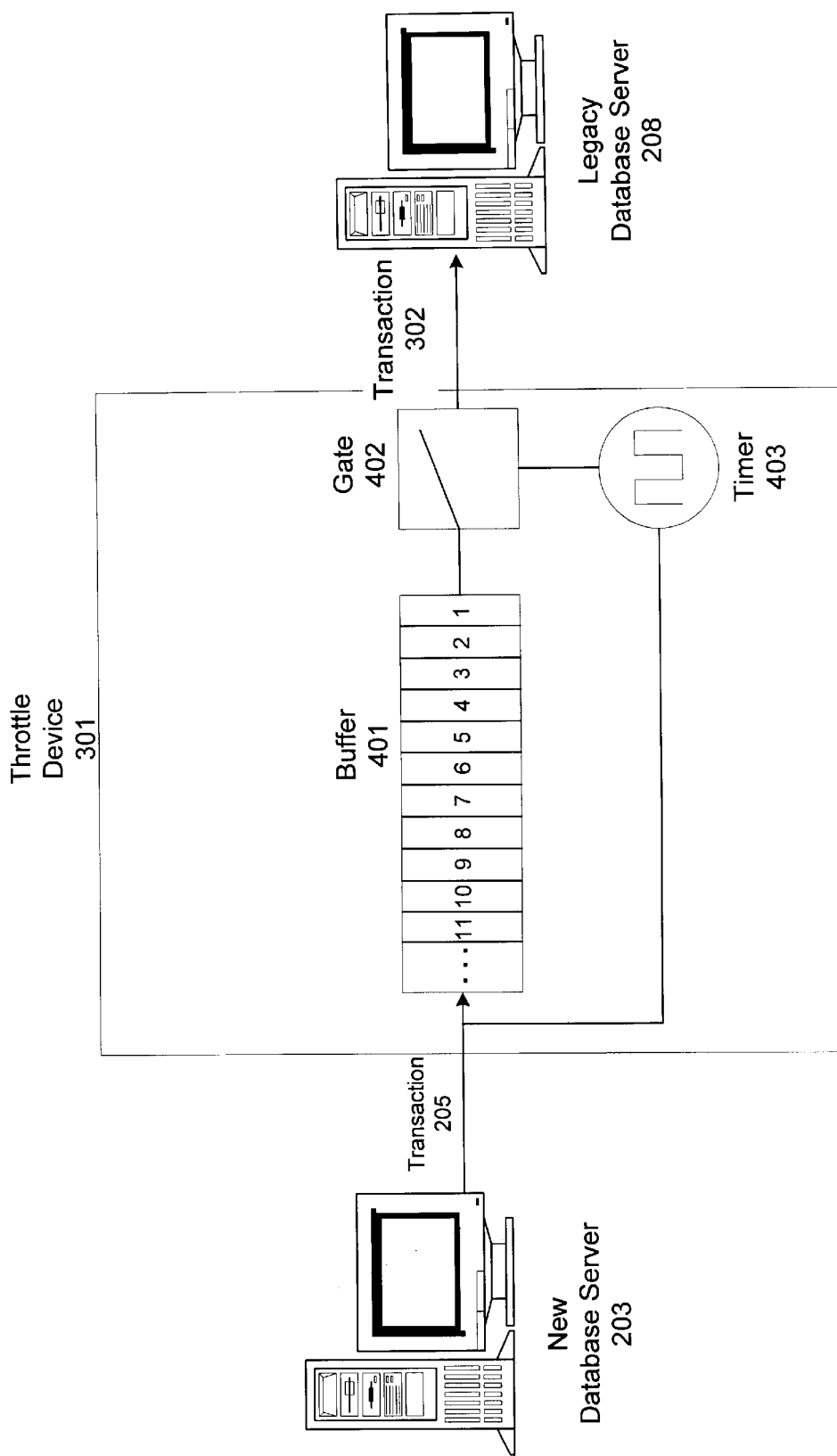
FIG. 4 provides a schematic diagram of a throttle device, according to the present invention.

FIG. 4 provides a schematic diagram of throttle device 301, according to the invention. As discussed, new database server 203 is capable of providing transactions 205 at a rate faster than the rate at which legacy database server 208 is capable of processing incoming transactions 302. Because the capacity of legacy database server 208 is known to the database system administrator, throttle device 301 can be set to monitor the rate of incoming transactions 205 from new database server 203, and delay incoming transactions 205 when they arrive at a rate that exceeds legacy database server's 208 predetermined capacity. Alternatively, throttle device 301 will allow transactions 205 to pass to legacy database server 208 without delay, when incoming transactions 205 arrive at a rate less than legacy database server's 208 predetermined capacity.

As shown in FIG. 4, throttle device 301 includes a buffer 401 (e.g., a first-in first-out queue) that is coupled to a gate 402. A timer 403 is coupled to gate 402 and to incoming transactions 205. Timer 403 is set to permit transactions 205 to enter legacy database server 208 at a rate consistent with the processing speed of legacy database server 208. When transactions 205 begin to exceed the predetermined rate at which legacy database server 208 is capable of processing transactions 302, timer 403 closes gate 402. As shown in FIG. 4, when gate 402 is closed (i.e., not allowing transactions in buffer 401 to pass onto legacy database server 208), transactions 205 provided by new database server 203 enter throttle device 301 and are stored in buffer 401. In FIG. 4, each of buffered transactions 205 are numbered (e.g., 1 through 11) in the order in which they are received. The number of actual transactions 205 that buffer 401 can store will be determined by the rate at which transactions 205 are provided by new database server 203 and the rate at which transactions 302 can be processed by slower legacy database server 208. For example, FIG. 4 shows at least eleven received queries 205 located in buffer 401. In effect, therefore, timer 403 allows transactions queued in buffer 401 to pass to legacy database server 208 at the same rate, regardless of the rate of incoming transactions 205. If the rate of incoming transactions 205 is less than the processing rate of legacy database server 208, transactions 205 will pass through throttling device 301 without delay. If, on the other hand, the rate of incoming transactions 205 is greater than the processing rate of legacy database server 208, throttling device 301 will begin to store transactions 205 in buffer 401.

Notably, the predetermined rate at which legacy database server 208 can process transactions 302 may be set, and dynamically adjusted, in timer 403. For example, if legacy database server 208 were replaced with a system having more or less processing capacity, an administrator could adjust the predetermine rate in timer 403 to send the transactions more or less often, as the case may be.

Figure 5:
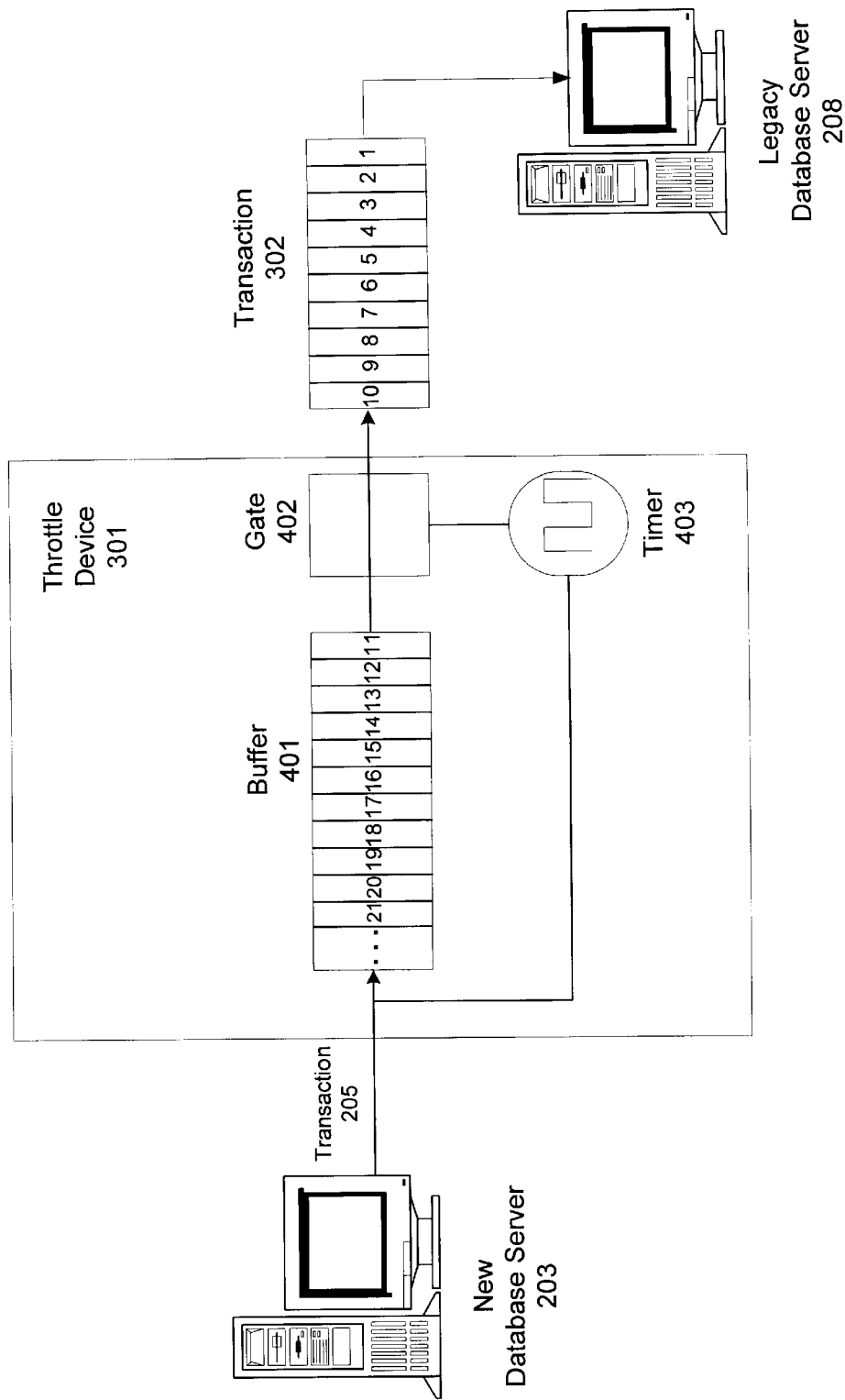
FIG. 5 provides another schematic diagram of a throttle device, according to the present invention.

FIG. 5 provides a detailed schematic diagram of throttle device 301 in which gate 402 is shown open . If timer 403 notices that transactions 205 are not exceeding the rate at which legacy database server can process, timer 403 will open gate 402, thus allowing transactions 302 to enter legacy database server 208. As shown in FIG. 5, transactions 1 through 10 have been sent to legacy database server 208 by throttle device 301.

The following code provides an example of how throttle device 301 may operate:
The timer is represented by the following code fragment:

```
HRESULT WatchDogThreadFunction(LPVOID lpParam)
{
    HRESULT hResult = S_OK;
    DWORD     dwWatchDogWaitTime = 0;
    DWORD    dwWaitResult = 0;
    do
    {
        dwWaitResult = WaitForSingleObject( g_h WatchDogEvent,
    g_ulThrottleDelayInterval);
        if ( WAIT_TIMEOUT == dwWaitResult )
```

-continued

```
        SetEvent( g_hSerializeEvent);
    } while ( FALSE == g_bKillWatchDogThread );
    return hResult;
}
```
The above timer sends a signal every g_ulThrottleDelayInterval
to the main process shown below:
```
    UINT MainQProcessorThreadFunction( LPVOID pParam)
    {
      do
      {
        do
        {
        //wait on serialize event to get signalled
            dwWaitResult = WaitForSingleObject( g_hSerializeEvent,
        SERIALIZE_EVENT_WAIT);
            } while (( WAIT_TIMEOUT == dwWaitResult) &&
        (FALSE == pDriver->GetStopThreadsFlag( )));
            DoWork( );
        } while (FALSE == pDriver->GetStopThreadsFlag( ));
        return 0;
    }
```

The example code has three main components. The first main component is a "throttle thread," respresented by "HRESULT WatchDogThreadFunction(LPVOID 1pParam))." The "throttle thread" establishes the timer function of throttle device 301. The "throttle thread" includes a "throttle event" represented by "g_hWatchDogEvent" and a "throttle value" represented by "g_ulThrottleDelayInterval." The second component is a "worker thread," respresented by "UINT MainQProcessorThreadFunction(LPVOID pParam)." The "worker thread" processes queue messages and provides them to legacy database server 208. The third main component is called a "signalwork" event, and is represented by "g_hSerializeEvent." The "worker thread" waits on "signalwork" indefinitely. When the "throttle event" times out, as determined by the "throttle value," the "throttle event" signals the "signalwork" to allow the "worker thread" to process a next transaction. Increasing the predetermined interval set by the "throttle value" allows the "worker thread" to be executed at a slower rate, commensurate with legacy database server 208.

Figure 6:
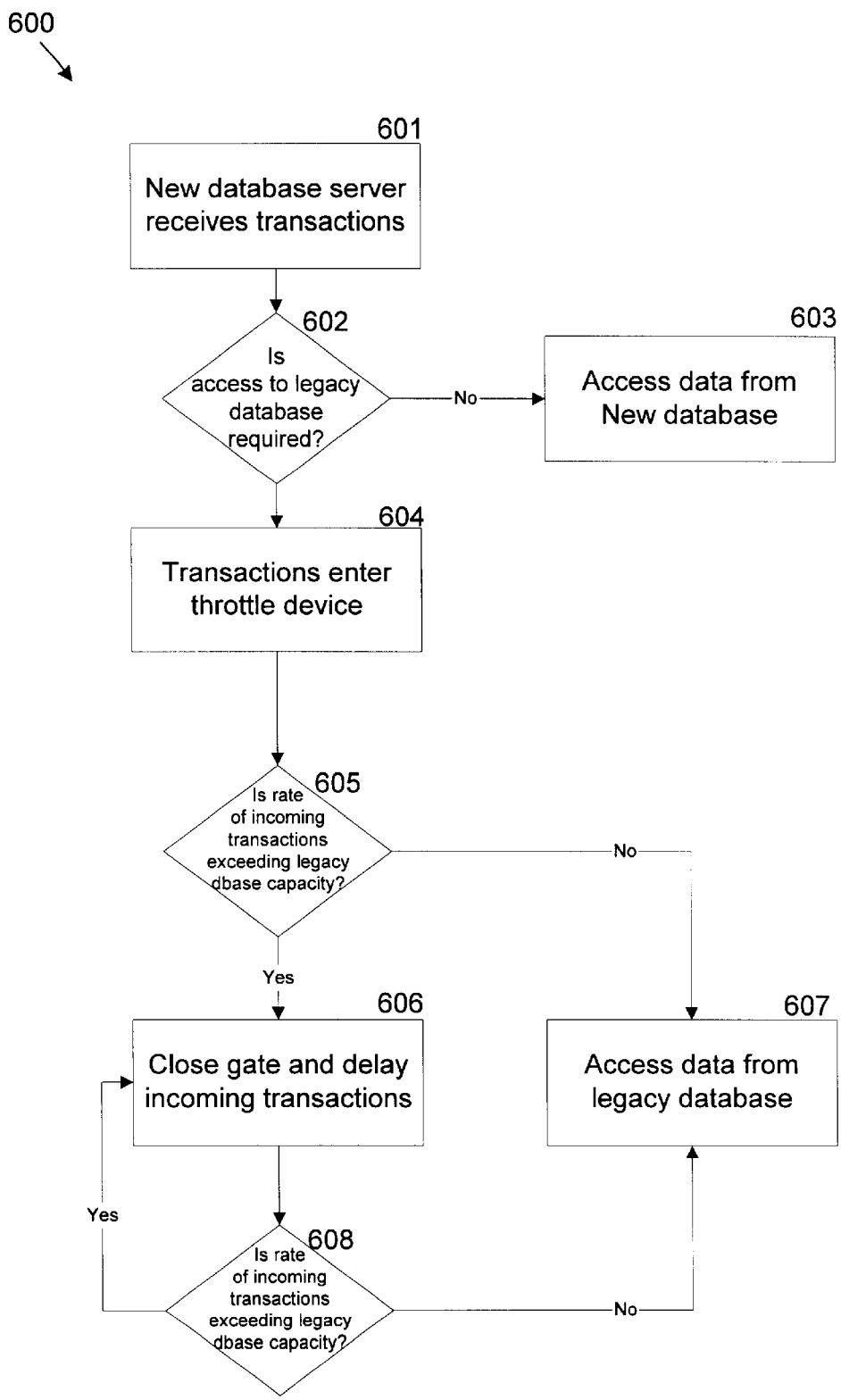
FIG. 6 provides a flow diagram of a method for transferring data between disparate capacity databases in a client-server database system, according to the present invention.

FIG. 6 provides a flow diagram 600 of a method for transferring data between disparate capacity databases in a client-server database system. In step 601, client computer 201 provides transactions 205 to new database server 203. In step 602, new database server 203 determines whether any of transactions 205 require access to database 204 or legacy database 207. If transactions 205 require access to database 204, new database server 203 accesses database 204.

If, on the other hand, transactions 205 require access to legacy database 207, new database server 203 sends transactions 205 to throttle device 301, in step 604. In step 605, it is determined whether the rate of incoming transactions 205 has exceeded legacy database server's 208 capacity. If the rate of incoming transactions has not exceeded legacy database server's 208 capacity, data is accessed from legacy database 207, in step 607. If, on the other hand, the rate of incoming transactions has exceeded legacy database server's 208 capacity, in step 606, gate 402 is opened and incoming transactions 205 are delayed from entering legacy database server 208.

In step 608, once it is determined that the rate of incoming transactions 205 has not exceeded legacy database server's 208 capacity, data is accessed from legacy database 207, in step 607.

The present invention is directed to a system and method for transferring data between disparate capacity systems, but is not limited to database components, regardless of any specific description in the drawing or examples set forth herein. It will be understood that the present invention is not limited to use of any of the particular components or devices herein. Indeed, this invention can be used in any application that transfers data between disparate capacity systems or components. For example, although the present invention was described in the context of disparate capacity systems, it should be appreciated that the invention may apply to equivalent capacity systems that are run at different speeds to increase overall performance. Furthermore, the system disclosed in the present invention can be used with the method of the present invention or a variety of other applications.

While the present invention has been particularly shown and described with reference to the presently preferred embodiments thereof, it will be understood by those skilled in the art that the invention is not limited to the embodiments specifically disclosed herein. Those skilled in the art will appreciate that various changes and adaptations of the present invention may be made in the form and details of these embodiments without departing from the true spirit and scope of the invention as defined by the following claims.

We claim:

1. A method for transferring data between disparate capacity database systems, comprising the steps of:
    receiving transactions from a first database system at a first rate;
    providing said transactions to a second database system, wherein said second database system is capable of receiving said transactions at a second rate; and
    determining if said transactions provided by said first database system at said first rate exceed said second rate of said second database system; and
    delaying for a predetermined period of time said transactions when said first rate exceeds said second rate, wherein said predetermined period of time is adjusted as a function of said capacity of said second database system.

2. The method of claim 1, wherein said predetermined period of time is a function of said second rate.

3. The method of claim 1, wherein said second database system is a transaction processor and said first database system is a data retrieval/entry device.

4. The method of claim 1, wherein said second database system is a legacy database server and said first database system is an updated database server.

5. The method of claim 1, wherein said predetermined period of time is a function of a processing speed of said second database system.

6. The method of claim 1, wherein said predetermined period of time is a function of a capability of said second database system to process said transactions.

7. A device for interfacing disparate capacity computer systems, comprising:
    an input component for receiving transactions from a first database system at a first rate;
    an output component for providing transactions to a second database system at a second rate; and
    a buffer component coupled to said input component and said output component, wherein said buffer component determines if said transactions provided by said first database system at said first rate exceed said second rate of said second database system, and wherein said buffer component delays said transactions for a predetermined period of time when said first rate exceeds said second rate, wherein said second rate is set at a capacity of said second database system.

8. The device of claim 7, wherein said transactions include data requests and/or data entries.

9. The device of claim 7, wherein said predetermined period of time is a function of said second rate.

10. The device of claim 7, wherein said second database system is a legacy database server and said first database system is an updated database server.

11. The device of claim 7, wherein said first database system is a data retrieval/entry device, and wherein said second database system is a transaction processor.

12. The device of claim 7, wherein said predetermined period of time is a function of a processing speed of said second database system.

13. A disparate capacity computing system, comprising:
 a first database system that generates transactions at a first rate;
 a queue coupled to said first database system, wherein said queue receives said transactions from said first database system;
 a gate device coupled to said queue, wherein said gate device permits said transactions to exit said queue at a predetermined rate; and
 a second database system coupled to said gate device, wherein said second database system processes said transactions at a second rate.

14. The system of claim 13, wherein said transactions include data requests and/or data entries.

15. The system of claim 13, wherein said predetermined rate is a function of said second database system.

16. The system of claim 13, wherein said second database system is a transaction processor, and wherein said first database system is a data retrieval/entry device.

17. The system of claim 13, further comprising inputting said transactions to said second database system after said predetermined delay when said first rate exceeds said second rate.

18. The system of claim 13, wherein said predetermined rate is a function of a processing speed of said second database system.

19. The system of claim 13, wherein said predetermined rate is a function of a capability of said second database to process said transactions.

20. A computer-readable medium having computer-executable instructions for performing the steps of:
 receiving transactions from a first database system at a first rate;
 providing said transactions to a second database system, wherein said second database system receives said transactions at a second rate;
 determining if said transactions provided by said first database system at said first rate exceed said second rate of said second database system; and
 delaying for a predetermined period of time said transactions when said first rate exceeds said second rate, wherein said predetermined period of time is adjusted as a function of said capacity of said second database system.

21. The computer-readable medium of claim 20, wherein said predetermined period of time is a function of said second rate.

22. The computer-readable medium of claim 20, wherein said second rate is set at a capacity of said second database system.

23. The computer-readable medium of claim 20, wherein said second database system is a transaction processor and said first database system is a data retrieval/entry device.

24. The computer-readable medium of claim 20, wherein said second database system is a legacy database server and said first database system is an updated database server.

25. The computer-readable medium of claim 20, wherein said predetermined period of time is a function of a processing speed of said second database system.

26. The computer-readable medium of claim 20, wherein said predetermined period of time is a function of a capability of said second database system to process said transactions.

27. A throttling device for interfacing disparate capacity computer database systems, comprising:
 an input component for receiving transactions from a first database system at a first rate, wherein said transactions include data requests and/or data entries;
 an output component for providing transactions to a second database system at a second rate; and
 a buffer component coupled to said input component and said output component for delaying said transactions for a predetermined period of time when said first rate exceeds said second rate, wherein said predetermined period of time is a function of said second rate.

* * * * *